Dec. 4, 1951  C. W. WILLIS  2,577,058
MOUNTING FOR JETTISONABLE AIRCRAFT ENGINES
Filed June 21, 1949  2 SHEETS—SHEET 1
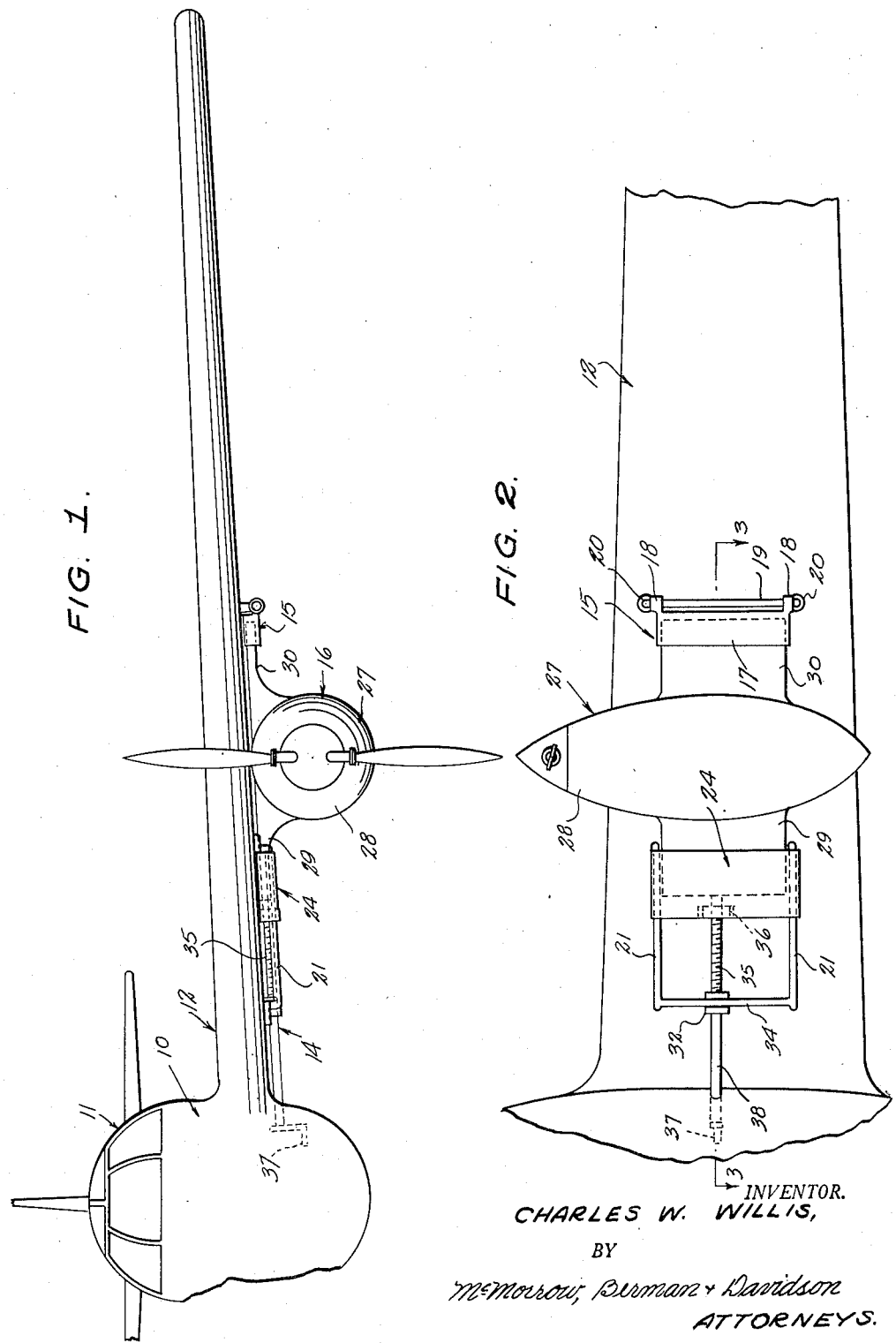
INVENTOR.
CHARLES W. WILLIS,
BY
McMorrow, Berman + Davidson
ATTORNEYS.

Dec. 4, 1951  C. W. WILLIS  2,577,058
MOUNTING FOR JETTISONABLE AIRCRAFT ENGINES
Filed June 21, 1949  2 SHEETS—SHEET 2
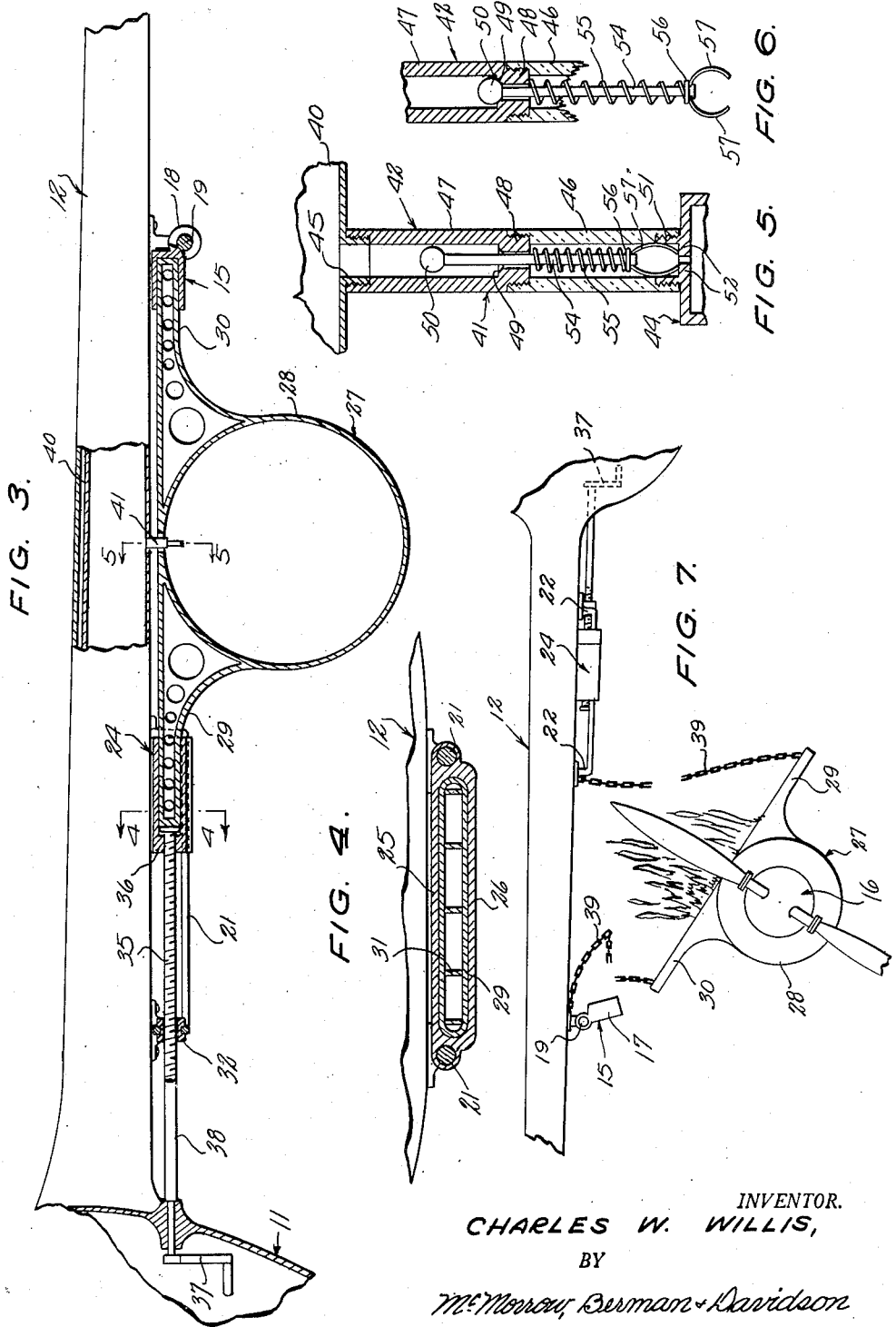
INVENTOR.
CHARLES W. WILLIS,
BY
McMurray, Berman + Davidson
ATTORNEYS.

Patented Dec. 4, 1951

2,577,058

UNITED STATES PATENT OFFICE 2,577,058

MOUNTING FOR JETTISONABLE AIRCRAFT ENGINES

Charles W. Willis, Lynn, Ala.

Application June 21, 1949, Serial No. 100,429

4 Claims. (Cl. 244—54)

This invention relates to an engine mounting for aircraft engines and the like, and more particularly to an aircraft engine mount for detaching the engine from within the body or fuselage while in flight.

It is an object of this invention to provide an aircraft engine-releasable mounting means for releasing the engine while in flight in order to prevent the further damage to the aircraft after the engine has become disabled, as by fire or other damage.

Another object of this invention is to provide a releasable motor mount of the kind to be more particularly described hereinafter which is actuated by the pilot or other person in the cockpit or fuselage when necessary or desired. The releasable mounting means is particularly designed for dropping a burning engine while in flight in order to prevent the wings or fuselage from catching afire and enabling the pilot to land the aircraft in time not limited by the flames of the burning engine or burning aircraft structure adjacent the engine. Suitable quick disconnecting fuel lines are engaged between the releasable engine and the adjacent fuel lines to prevent the further flow of fuel onto the aircraft structure when the engine has been dropped.

A further object of this invention is to provide a releasable motor-mounting means for multimotored aircraft for dropping a burning or severely vibrating damaged engine in order to minimize the dangers of landing and otherwise handling the aircraft in flight after such damage has occurred on one of the engines.

With the above and other objects in view, my invention consists in the arrangement, combination and details of construction disclosed in the drawings and specification, and then more particularly pointed out in the appended claims.

In the drawings:

Figure 1 is a front elevation, partly broken away, of an aircraft having a detachable enginemounting means constructed according to an embodiment of this invention;

Figure 2 is a bottom plan view;

Figure 3 is a longitudinal section taken on the line 3—3 of Figure 2;

Figure 4 is a fragmentary transverse section taken on the line 4—4 of Figure 3;

Figure 5 is a fragmentary detail section taken on the line 5—5 of Figure 3, showing the structure of the quick-acting valve means for the fuel lines;

Figure 6 is a fragmentary detail section of the valve shown in Figure 5, showing the valve in the closed position;

Figure 7 is a front elevation, partly broken away, of the aircraft showing the engine in its released position from the mounting means.

Referring to the drawings, the numeral 10 designates generally a multi-engined aircraft including a fuselage 11 and an outwardly-extending wing 12 mounted on one side thereof. The wing 12 shown in the drawings is duplicated on the opposite side, and the quick-releasing motor mount, to be described as applied on one of the wings 12, is suitably applied to similar quick-releasing engine-mounting means as applied to other engines on the other side of the fuselage 11.

The quick-releasing motor-mounting means 14 constructed according to an embodiment of this invention is particularly adapted for use on multi-engined aircraft for releasing or dropping a selected one of the engines when the engine is damaged and is burning, in order to prevent the flames from the burning engine from igniting or otherwise damaging the adjacent aircraft structure, as the wing on which the engine-mounting means is applied. In the use of conventional multi-engined aircraft, when one of the engines becomes damaged or excessively vibrating or resulting in burning, generally the flames or vibrating engines require that the occupants of the aircraft immediately leave the aircraft, as it would be damaged in a very short time to a condition where it would be impossible to land the aircraft in a crash-landing manner. By providing a quick-releasing motor-mounting means formed according to an embodiment of this invention, the damaged engine may be dropped from the aircraft, and, therefore, permit the pilot sufficient time to properly navigate the aircraft to accomplish a suitable crash landing.

The releasable engine mount 14 is formed with an elongated sleeve member 15 pivotally connected on the under side of the wing from which the engine 16 is to be suspended. The sleeve member 15 is formed with an elongated sleeve body 17 which extends chordwise of the wing 12 and is pivotally mounted thereon. A pair of hinge lugs or barrels 18 are fixed on the opposite ends of one edge of the sleeve body 17 and are engaged by a pintle 19 or hinge member which is fixedly secured by suitable mounting means 20 to the wing 12.

A pair of transversely-spaced-apart guide or bearing members 21 are fixed on the lower side of the wing 12 inwardly from the sleeve member 15. The bearing or guide members 21 extend longitudinally of the wing or spanwise. The guide members 21 are spaced apart across the chord or transversely of the wing 12, as clearly shown in Figure 2 of the drawings. The opposite ends of the guide members 21 are extended upwardly forming mounting pedestals 22 which are fixedly supported on the wing. A second sleeve member 24 is slidably supported on the guide members 21 for sliding longitudinally or spanwise of the wing 12. The sleeve member 24 is formed with a pair of vertically-spaced-apart plates 25 and 26 which are connected together at the opposite ends thereof and the opposite ends of the plates 25 and 26 are slidably supported on the guide members 21, as clearly shown in Figure 4 of the drawings.

The nacelle or engine-mounting and -supporting member 27 is formed for releasable engagement with the sleeve members 15 and 24. The nacelle 27 is formed as an elongated body 28 within which the engine 16 is adapted to be fixedly mounted in a substantially conventional manner.

The engine nacelle 27 is formed with a pair of outwardly-extending side-supporting arms 28 and 29 fixedly secured to the upper edge thereof. The outwardly-extending arms 29 and 30 may be formed integrally with the nacelle body 28 at the upper end thereof, or otherwise suitably secured thereon. The arms 29 and 30 may be hollow and oval in configuration, as noted in Figure 4 of the drawings. The hollow arms 29 and 30 are formed with outwardly-extending reinforcing webs or members 31 extending outwardly from the center portion of the nacelle 27. The inner ends of the arms 29 and 30 are of a substantial thickness and may be suitably faired into the outer surface of the body 28, as clearly noted in Figure 3 of the drawings. The outer ends of the arms 29 and 30 are formed for slidable engagement in the sleeve members 24 and 15, respectively.

The outer arm 30, as noted in the drawings, is slidably engageable within the sleeve member 15, and then the engine nacelle 27 is swung or pivoted about the pivot member 19 to the horizontal assembled position. With the nacelle 27 in its proper position on the lower side of the wing 12, the slidable sleeve member 24 is moved outwardly on the guide rails or channels 21 for receiving therein the other supporting arm 29.

A bearing 32 is fixedly supported between the guide members 21 on a transverse supporting member 34, at the rear end thereof. A nut element 36 is fixedly supported on the slidable sleeve member 24 on the inner side thereof, and the outer end of the bolt 35 is threadably engaged therein. The extreme outer end of the bolt or screw 35 is adapted to rotatably engage the extreme inner end of the inwardly-extending arm 29 for holding the nacelle 27 against inward movement upon sliding of the locking member 24.

In the use and operation of the releasable motor-mounting means 14 described above, with the engine securely supported in its assembled position, as noted in Figure 1 of the drawings, the arms 29 and 30 and the nacelle will be securely supported within the sleeve members 24 and 15. When the engine 16 is damaged while in flight, or catches fire, and it is desired to drop the engine, a crank 37 within the fuselage 11 may be rotated for sliding the sliding and movable sleeve member 24 for releasing the nacelle 27. The crank 37 is suitably connected to an outwardly-extending rod or connecting means 38 which is operatively engaged with the inner end of the screw 35. Upon rotation of the crank 37 in one direction, the screw 35 will be rotated in the nut 36 for sliding the sleeve member 24 inwardly on the guide members or rails 21. The outer end of the screw 35 will engage the inner end of the arm 29 for holding the nacelle 27 in its mounted position until the sleeve 24 is moved inwardly beyond the extreme inner edge of the arm. At this time, the weight of the engine 16 within the nacelle 27 will pivot the engine and the sleeve member 15 about the pintle 19 and the arm 30 will be free to slide out of the sleeve member 15. The sleeve member 15 will then swingably depend from the hinge pin 19 in the position as shown in Figure 7 of the drawings.

If it is desired to limit the disposition of the engine 16 merely to a position remote from the wing 12, suitable chains or other flexible suspension members 39 may be connected between the outer ends of the arms 29 and 30, and the lower side of the wing 12. In this manner, the engine 16 may be dropped from the wing 12 while the aircraft is at rest on the ground for suitably and expeditiously changing the engine and the chains 39 will limit the downward dropping of the engine so that the engine will not be damaged as a result of the drop.

When the engine nacelle 27 and engine 16 are dropped from the wing of an aircraft in flight, the fuel lines connected between the engine 16 and the gas tank 40 will spill gasoline over the surface of the aircraft unless it is suitably stopped by a proper type of valve operable immediately upon the release of the nacelle. In order to provide for the quick stopping of the fuel line when the engine 16 is dropped from the aircraft 10, I have provided a suitable quick-acting valve 41 for connection within the fuel line 42 between the fuel tank 40 and the engine 16. The valve 41 is connected between two sections 44 and 45 of the fuel line 42 and includes a frangible tubular member 46. A valve seat bearing member 47 is secured at its upper end to the lower end of the fuel line member 45 and the upper end of the frangible tubular member 46 is threadably engaged on the depending boss 48 of the tubular valve seat bearing member 47. The fuel line 42 is thus provided with a frangible fuel control means.

The upper end of the boss 48 within the tubular member 47 is formed with a conical valve seat 49 within which the valve or valve head 50 is adapted to be securely seated when the frangible member 46 is ruptured.

The lower end of the frangible tubular member 46 is threadably engaged on an upwardly-extending stud or boss 51 which is carried by the lower fuel line section 44. A pair of inwardly-extending stop elements or members 52 are carried by the boss 51 at the lower end thereof to provide retaining means for the valve 41 for holding the valve open during the normal operation of the aircraft.

A valve stem 54 is slidably engaged through the valve seat 46 and is fixed on the lower side of the valve 50 extending downwardly within the frangible sleeve or tube 46. A coil spring 55 is engaged about the valve stem 54 within the frangible tube 46 and bears against a washer or peripheral flange 56 on the lower end thereof. The upper end of the spring 55 bears against the lower side of the boss 48 in the upper end of the tube 46 for constantly biasing the valve 50 into engagement with the seat 49 for closing the fuel line 42.

A pair of downwardly-bowed resilient spring members 57 are fixed on the lower end of the valve stem 54 and extend downwardly therefrom. The resilient members 57 are biased outwardly for frictional engagement with the inner surface of the tubular member 46 and the lower ends are engageable with the upper sides of the stop elements 52 for holding the valve stem 54 upwardly against the spring tension acting thereon. The fingers 57 in engagement with the stop members 52 constantly hold the valve 50 raised above the valve seat 49 to provide for the free flow of the fuel from the gas tank 40 to the engine 16. Upon dropping of the engine 16 by actuation of the releasable motor-mounting means 14, when the engine 16 drops from the sleeves 15 and 24, the tubular member 46 will be ruptured and the spring 55 will bias the valve 50 into engagement with the valve seat 49 for shutting off the flow of fuel, thereby preventing the inadvertent splashing of fuel onto the surface of the aircraft or in a position to be ignited by flames from the engine.

I do not mean to confine myself to the exact details of construction herein disclosed, but claim all variations falling within the purview of the appended claims.

I claim:

1. The combination with an airplane including a fuselage, a wing extending therefrom, and a tank for containing fuel in said wing, of a mount for dependingly mounting a motor on said wing intermediate its ends thereof, said mount comprising a sleeve member open at one end and closed at the other end arranged below and spaced inwardly of the free end of said wing with its open end facing said fuselage and mounted on said wing for swinging movement about a horizontal axis, a second sleeve member open at one end and closed at the other end arranged below the wing and spaced from said fuselage with its open end facing the open end of said first sleeve member and mounted on said wing for longitudinal movement toward and away from said first sleeve member, an engine supporting member dependingly positioned between said sleeve members and slidably supported in said sleeve members, a frangible fuel control valve means having one end in communication with said fuel tank and having the other end in communication with said engine supporting member, and hand actuable means within said fuselage and operatively connected to said second sleeve member for effecting longitudinal movement of the latter.

2. A combination with an airplane including a fuselage, a wing extending therefrom, of a mount for dependingly mounting a motor on said wing intermediate its ends thereof, said mount comprising a sleeve member open at one end and closed at the other end arranged below and spaced inwardly of the free end of said wing with its open end facing said fuselage and mounted on said wing for swinging movement about a horizontal axis, a second sleeve member open at one end and closed at the other end arranged below the wing and spaced from said fuselage with its open end facing the open end of said first sleeve member and mounted on said wing for longitudinal movement toward and away from said first sleeve member, an engine supporting member dependingly positioned between said sleeve members and slidably supported in said sleeve members, and hand actuable means within said fuselage and operatively connected to said second sleeve member for effecting longitudinal movement of the latter.

3. A combination with an airplane including a fuselage, a wing extending therefrom, of a mount for dependingly mounting a motor on said wing intermediate its ends thereof, said mount comprising a sleeve member open at one end and closed at the other end arranged below and spaced inwardly of the free end of said wing with its open end facing said fuselage and mounted on said wing for swinging movement about a horizontal axis, a second sleeve member open at one end and closed at the other end arranged below the wing and spaced from said fuselage with its open end facing the open end of said first sleeve member and mounted on said wing for longitudinal movement toward and away from said first sleeve member, an engine supporting member, a first arm positioned on one side of said engine supporting member having one end secured thereto and having the other end extending through the open end of said first sleeve member and slidably supported in the latter member, a second arm positioned on the other side of said engine supporting member having one end fixedly secured to the latter member and having the other end extending through the open end of said second sleeve member and slidably supported therein, and hand actuable means within said fuselage operatively connected to said second sleeve member for effecting longitudinal movement of the latter.

4. A combination with an airplane including a fuselage, a wing extending therefrom, of a mount for dependingly mounting a motor on said wing intermediate its ends thereof, said mount comprising a sleeve member open at one end and closed at the other end arranged below and spaced inwardly of the free end of said wing with its open end facing said fuselage and mounted on said wing for swinging movement about a horizontal axis, a second sleeve member open at one end and closed at the other end arranged below the wing and spaced from said fuselage with its open end facing the open end of said first sleeve member and mounted on said wing for longitudinal movement toward and away from said first sleeve member, an engine supporting member, a first arm positioned on one side of said engine supporting member and having one end secured thereto and having the other end extending through the open end of said first sleeve member and slidably supported in the latter member, a second arm positioned on the other side of said engine supporting member having one end fixedly secured to the latter member and having the other end extending through the open end of said second sleeve member and slidably supported therein, a longitudinally extending rod rotatably supported in said fuselage and having one end projecting into the interior of said fuselage and having the other end extending through the closed end of said second sleeve member and engageable with the latter, and hand actuable means on said projecting one end for effecting the rotation of said rod to thereby cause the longitudinal movement of the second sleeve member.

CHARLES W. WILLIS.

REFERENCES CITED

The following references are of record in the file of this patent:

UNITED STATES PATENTS

| Number | Name | Date |
|---|---|---|
| 1,237,889 | Fernandez | Aug. 21, 1917 |
| 1,650,346 | Hall | Nov. 22, 1927 |
| 1,672,163 | Krammer | June 5, 1928 |
| 1,783,227 | Dornier | Dec. 2, 1930 |
| 2,199,588 | Cobham et al. | May 7, 1940 |
| 2,426,537 | Van Dorn | Aug. 26, 1947 |